US012705321B2

(12) United States Patent
Wadhwa et al.

(10) Patent No.: US 12,705,321 B2
(45) Date of Patent: Aug. 11, 2026

(54) INTEGRATED IDENTITY MANAGEMENT AND MONITORING SYSTEM, APPARATUS, AND STORAGE MEDIUM

(71) Applicants: RAKUTEN MOBILE, INC., Tokyo (JP); RAKUTEN MOBILE USA LLC, San Mateo, CA (US)

(72) Inventors: Jatin Wadhwa, Tokyo (JP); Anshul Bhatt, Tokyo (JP); Shiv Chandra Pathak, Tokyo (JP); Sahitya Jain, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 896 days.

(21) Appl. No.: 17/791,475

(22) PCT Filed: Mar. 7, 2022

(86) PCT No.: PCT/US2022/019090

§ 371 (c)(1),
(2) Date: Sep. 14, 2023

(87) PCT Pub. No.: WO2023/172237

PCT Pub. Date: Sep. 14, 2023

(65) Prior Publication Data

US 2024/0176855 A1 May 30, 2024

(51) Int. Cl.
*G06F 21/31* (2013.01)
*G06F 21/45* (2013.01)

(52) U.S. Cl.
CPC .............. *G06F 21/31* (2013.01); *G06F 21/45* (2013.01)

(58) Field of Classification Search
CPC ........... H04L 63/08; G06F 21/31; G06F 21/45
See application file for complete search history.

(56) References Cited

U.S. PATENT DOCUMENTS 10,375,177 B1* 8/2019 Bretan .................. H04L 67/146
2009/0328172 A1* 12/2009 Das ..................... H04L 67/1027 709/226
2010/0042846 A1* 2/2010 Trotter .................. H04L 63/104 235/375
2015/0382193 A1* 12/2015 Johnson .................. H04L 63/08 455/411
2016/0134616 A1* 5/2016 Koushik ............. H04L 63/0428 726/9
2017/0013003 A1* 1/2017 Samuni ................... G06F 11/00
2018/0278619 A1* 9/2018 Jankowfsky ........ G06F 21/6209
2020/0366716 A1* 11/2020 Singh ...................... H04L 63/08

(Continued)

OTHER PUBLICATIONS

International Search Report dated Jul. 15, 2022 in International Application No. PCT/US22/19090.

(Continued)

*Primary Examiner* — Dao Q Ho
(74) *Attorney, Agent, or Firm* — Sughrue Mion, PLLC

(57) ABSTRACT

A method for integrated authentication and monitoring, executed by an electronic device, the method comprising: authenticating user credentials of a user using an identity broker, wherein the identity broker identifies an identity provider associated with the user credentials; generating detailed logs related to events associated with the authenticating; analyzing the generated logs; and generating an alarm based on the analyzing of the generated logs.

16 Claims, 7 Drawing Sheets

(56) References Cited

U.S. PATENT DOCUMENTS

2022/0014510 A1* 1/2022 Polish ..................... G06N 5/04
2022/0103518 A1* 3/2022 LaChance ........... H04L 63/0435

OTHER PUBLICATIONS

Written Opinion of the International Searching Authority dated Jul. 15, 2022 in International Application No. PCT/US22/19090.
Amazon Web Services (AWS), "AWS Identity and Access Management", AWS Identity and Access Management User Guide, 2022, Retrieved From: URL: <https://web.archive.org/web/20220120055317/https://docs.aws.amazon.com/IAM/latest/UserGuide/iam-ug.pdf> (94 pages total).

* cited by examiner

100
B2B2C 102
B2BE 104
Employee 106
IMS Admin 101
Business Applications 108
API gateway 112
User Mgmt UI 110
User Mgmt API 113
User Mgmt DB 114
ID Mgmt Service API 116
Database and cache memory 124
Identity Management System (IMS) 120
IMS Database 122
Obs. Framework 128
Encrypted Data Vault 130
Intra System 132
External User Access System 134
Active Directory 136

Figure 6:
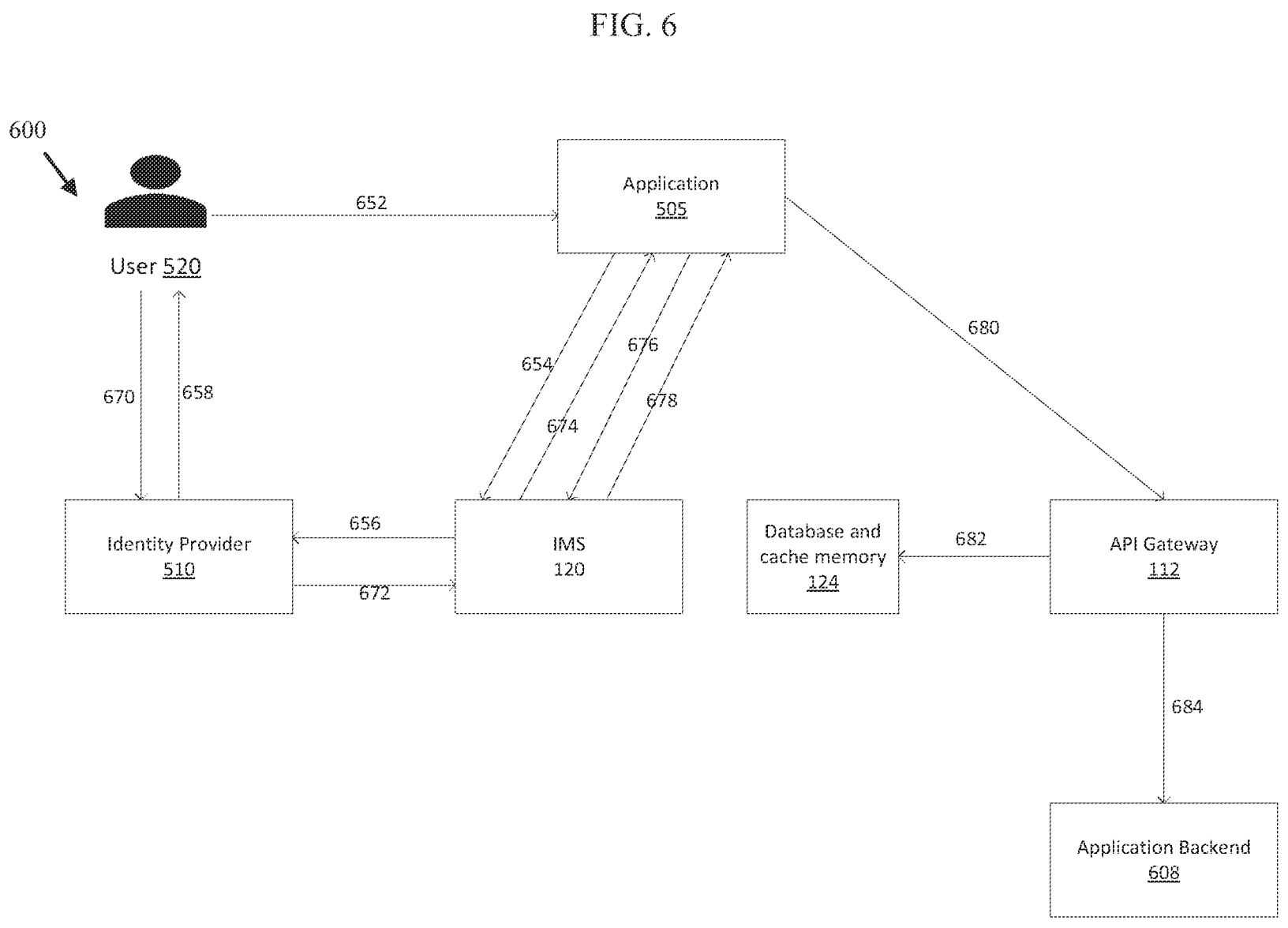

User 520

Application 505

Identity Provider 510

IMS 120

Database and cache memory 124

API Gateway 112

Application Backend 608

652

654

656

658

670

672

674

676

678

680

682

684

Encrypted Data Vault
130
IMS
120
E2EO Provisioning
702
700
752
754
756
758
760
762
764

INTEGRATED IDENTITY MANAGEMENT AND MONITORING SYSTEM, APPARATUS, AND STORAGE MEDIUM

CROSS REFERENCE TO RELATED APPLICATIONS

This application is a National Stage of International Application No. PCT/US2022/019090, filed on Mar. 7, 2022.

BACKGROUND

Identity management processes in a computing system that includes a plurality of devices, applications, and users/user roles are generally very important to resource management and access control of protected information in the system. With an increase in the software components of a computing system, an increase in services, and an increase in users, identity management becomes challenging and complex. For example, many users may belong to different roles or may be associated with a specific application among a plurality of applications, so ensuring that a user has access only to information associated with the specific application becomes difficult. Further, monitoring such complex systems to identify faults or determine performance is also difficult.

SUMMARY

According to embodiments, a method for integrated authentication and monitoring, executed by an electronic device, includes authenticating user credentials of a user using an identity broker, wherein the identity broker identifies an identity provider associated with the user credentials; generating detailed logs related to events associated with the authenticating; analyzing the generated logs; and generating an alarm based on the analyzing of the generated logs.

According to embodiments, the authentication may include receiving the user credentials of the user; determining the identity provider associated with the user credentials using the identity broker, wherein the identity provider is one of a plurality of identity providers, and an application is associated with the identity provider; receiving a security token from the identity provider indicating a successful authentication of the user by the identity provider; and generating an access token for the user to access the application associated with the identity provider.

According to embodiments, the generating detailed logs may include logging actions performed during any of the authenticating, user profile changes, role assignments, and new application registrations; calculating key performance metrics associated with user actions based on the logging; and calculating key performance metrics associated with respective applications based on the logging.

According to embodiments, the analyzing may include a comparison between the generated logs and historically logged data.

According to embodiments, the analyzing may also include determining there is a delay in one or more events based on the comparison between the generated logs and the historically logged data; and identifying a source of the delay, based on the generated logs.

According to embodiments, generating the alarm may include displaying a notification on a user interface wherein the notification indicates details about the delay and the source of the delay.

According to embodiments, the analyzing may also include: determining, based on the comparison, at least one of: a memory utilization in a pod is higher than a first threshold, a CPU utilization of the pod is higher than a second threshold, or a heap usage for the pod is higher than a third threshold; and generating the alarm comprises displaying a notification on a user interface wherein the notification indicates details about the at least one determining.

According to embodiments, prior to authenticating the user credentials, the method may include storing default admin credentials in an encrypted data vault, and wherein subsequent to generating the alarm, the method comprises generating a request to retrieve the default admin credentials from the encrypted data vault; and address a source of the alarm using the default admin credentials.

According to embodiments, prior to authenticating the user credentials, the method may include registering a new application, and wherein the registering the new application comprises: storing client secret credentials in an encrypted data vault; in response to determining that the new application needs to be deployed, generating a request to retrieve the client secret credentials from the encrypted data vault; and deploying the new application using the client secret credentials.

According to embodiments, prior to authenticating the user credentials, the method may include storing sensitive information associated with a new application, and wherein the storing the sensitive information for the new application comprises: receiving information associated with the new application, wherein the information includes confidential information relating to the new application and customers of the new application; extracting the confidential information relating to the new application and the customers of the new application; and storing the confidential information relating to the new application and the customers of the new application in an encrypted data vault.

According to embodiments, an apparatus for integrated identity management and monitoring may include: a memory configured to store instructions; and one or more processors configured to execute the instructions to: authenticate user credentials of a user using an identity broker, wherein the identity broker identifies an identity provider associated with the user credentials; generate detailed logs related to events associated with the authenticating; analyze the generated logs; and generate an alarm based on the analyzing of the generated logs.

According to embodiments, a non-transitory computer-readable medium storing instructions may include one or more instructions that, when executed by one or more processors of a device for automatic troubleshooting, cause the one or more processors to: authenticate user credentials of a user using an identity broker, wherein the identity broker identifies an identity provider associated with the user credentials; generate detailed logs related to events associated with the authenticating; analyze the generated logs; and generate an alarm based on the analyzing of the generated logs.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates a diagram of an example process for integrated identity management and monitoring system, according to embodiments;

DETAILED DESCRIPTION

Figure 1:
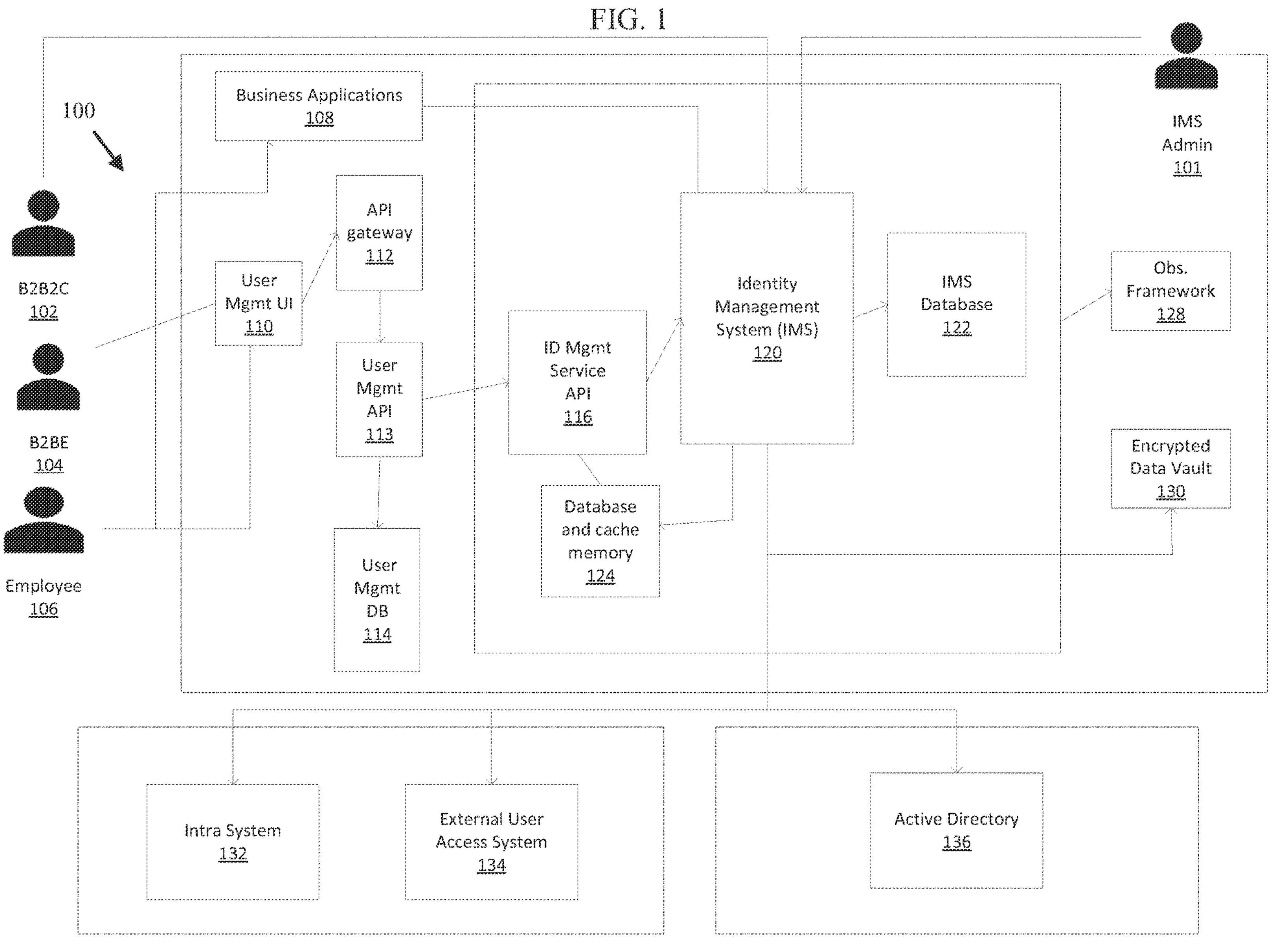
FIG. 1 is a diagram of an integrated identity management and monitoring system, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles “a” and “an” are intended to include one or more items, and may be used interchangeably with “one or more.” Where only one item is intended, the term “one” or similar language is used. Also, as used herein, the terms “has,” “have,” “having,” “include,” “including,” or the like are intended to be open-ended terms. Further, the phrase “based on” is intended to mean “based, at least in part, on” unless explicitly stated otherwise.

Embodiments may relate to integrated identity management and monitoring system. The identity management and monitoring system may be a centralized system containing an identity management system, an encrypted data vault system, a plurality of applications, a plurality of identity providers, and a plurality of users. In embodiments of the present disclosure, the encrypted data vault stores and provides confidential information required by the integrated identity management and monitoring system to be deployed, upgraded, reconfigured, or restarted.

In some embodiments of the present disclosure, the integrated identity management and monitoring system includes a monitoring module configured to log, process, analyze interactions between the different components of the integrated identity management and monitoring system, the actions, the plurality of identity providers, and the plurality of users. In some embodiments, the monitoring system may determine any faults in the integrated identity management and monitoring system. For example, the monitoring system may determine that a specific component of the integrated identity management and monitoring system was down, attacked, experienced unusual delays, etc. When the monitoring system determines that any of the above events have occurred, the monitoring system may determine the source based on the detailed logs generated by the monitoring system. This, in turn, allows for quick troubleshooting to be performed, resulting in lower network access issues.

In the related art, telecommunication network systems may be mainly hardware-based, and the hardware devices were usually proprietary or managed by specific vendors. Because of the fixed nature of these hardware devices, fewer parties are involved in developing and maintaining the network system. However, as telecommunications devices evolve, many of the network functions performed by these hardware devices may be defined by software instead. So even though fewer hardware devices may be used, a variety of software providers may be used, effectively increasing the number of parties involved in constructing, developing, and maintaining a network system. Since the number of parties involved or users of the network increases along with the number of services and devices accessed by the users, identity management of the users becomes more challenging and complex.

In addition to complex identity management in the related art, conventional identity management systems may not include an integrated monitoring function for monitoring the interaction between the different components of the identity management system and various applications and application providers. Often, an external monitoring system may be required to provide a monitoring function in the identity management system. The external monitoring system's requirements must be compatible with the identity management system. Once the external monitoring system and the identity management system are coupled, continuous monitoring of the connection between the identity management system and the external monitoring system is required to ensure that the external monitoring system operates optimally and remains compatible with the identity management system. Because these are two different systems, when an issue arises, a user may need to identify whether the problem is happening in the identity management system, in the external monitoring system, or whether the issue is due to the connection between the external monitoring system and the identity management system. Additionally, when the external monitoring system provides results to the identity management system on a periodical basis, an urgent issue requiring immediate attention may not be flagged in time, which may result in network access issues.

Embodiments of the present disclosure provide centralized and integrated identity management and monitoring system capable of managing multiple users' identities for multiple applications on one platform while allowing the integrated identity management and monitoring system to monitor the interactions between the different components of the system. This enables control of sensitive information, monitoring interactions to quickly and efficiently identify unusual operational activities, and performing rapid troubleshooting.

Embodiments of the present disclosure may include adaptive and real-time editing of users' applications and data access policies for external users and local internal users. Such adaptive changes enable the system to be scalable, reliable, and manageable.

Additionally, during deployment and operational activities, admin credentials may be required to deploy the identity management system. In the related art, a system admin may manually enter the admin credentials to deploy or restart the identity management system. Requiring a system admin to manually enter credentials during an unplanned shutdown or even a planned deployment or restart may be burdensome for the system admin. Waiting for a system admin to manually enter credentials may waste precious time in time-sensitive situations.

Embodiments of the present disclosure include an encrypted data vault containing sensitive data such as admin credentials, application secrets, and sensitive information related to applications. The encrypted data vault may be a component of the integrated identity management and monitoring system that may be accessed only by the identity management system. In some embodiments, the data stored in the encrypted data vault may be encrypted so that only the identity management system can decrypt and retrieve the data. Storing the data in an encrypted data vault so that only the integrated identity management and monitoring system may read the data stored in the encrypted data vault ensures data security and therefore prevent a data leak to a third party. In some embodiments of the present disclosure, the integrated identity management and monitoring system may automatically read admin credentials from the encrypted data vault in the event of an unscheduled or time-sensitive system deployment or restart. The automatic reading of the admin credentials reduces reliance on a system admin to enter credentials in unplanned or time-sensitive situations manually.

Embodiments of the present disclosure may enable reduced human involvement by providing automatic and secure access to sensitive and confidential information when unusual or time-sensitive issues occur in the network. In addition, embodiments provide monitoring capability, where the network interactions are monitored, and any unusual activity may be flagged quickly and efficiently, enabling a quick resolution for the issues. This rapid resolution of issues may reduce the cost of network operations, provide faster troubleshooting, help significant incident avoidance, and increase user satisfaction.

FIG. 1 is a diagram of an overview of an embodiment described herein. As shown in FIG. 1, an integrated identity management and monitoring system 100 may include identity management system 120, encrypted data vault 130, observation framework 128, business applications 108, user management UI 110, API gateway 112, user management API 113, user management database 114, intra system 132, external user access system 134, active directory 136, identity management system database 122, ID management API 116, and database and cache memory 124.

According to embodiments of the present disclosure, identity management system 120 may be used to provide centralized authentication and authorization service for business applications 108 associated with the integrated identity management and monitoring system 100. Identity management system 120 may be configured to broker authentication with external identity providers such as external user access system 134 for external users and with internal users through intra system 132. Identity management system 120 may also provide the capability to add more identity providers based on the requirement of the integrated identity management and monitoring system 100. In some embodiments, application roles and permissions may be stored in identity management system 120 and may be retrieved by applications for authorization.

The integrated identity management and monitoring system 100 may include a plurality of types of users. In some embodiments, users may be internal employees 106 and external users. The external users may include business-to-business electronic commerce (B2BE) 104 and business-to-business or business-to-consumers (B2B2C) 102. The external users may include users of the business applications 108 associated with the integrated identity management and monitoring system 100.

In some embodiments, the identity management system database 122 may be used to persistent data associated with identity management system 120. However, in some embodiments, session and some non-persistent data may not be stored in identity management system database 122, and instead may be stored in identity management system 120. For example, persistent data may include user profile data—firstname, lastname, email and username. In some embodiments, persistent data may also include user profile information, user access rights, role assignments, changes to roles and permissions, user credentials, application client data and client secrets. Passwords and confidential information may be stored as hash using PBKDF2. Identity management system 120 may also store user active session records (session id and roles) in database and cache memory 124.

Observation framework 128 may be configured to monitor events and interactions in the integrated identity management and monitoring system 100. Observation framework 128 may monitor fault tolerance, logging events and interactions, and tracing. In some embodiments, observation framework 128 may include a key developed to expose identity management system 120 events and interactions over an HTTP interface. In some embodiments, observation framework 128 may be used for faults and performance management using the logs and key application metrics. In some embodiments, the observation framework 128 may push alerts or alarms. In some embodiments, when an alarm may be raised, the observation framework 128 may alert an email list or custom list of users shared as a part of onboarding an application. In some embodiments, alarms may be raised based on platform level, application level, or user level metrics by the observation framework 128. In some embodiments, components of the integrated identity management and monitoring system may share data associated with their database connection, resource utilization, and logs with the observation framework 128 which may be used to create a dashboard.

The encrypted data vault 130 may be used to store extremely confidential data associated with default admin credentials, component service credentials, client secrets, and confidential information associated with applications. Data in the encrypted data vault 130 may be encrypted such that only the integrated identity management and monitoring system 100 or the identity management system 120 may be able to decrypt the data. In some embodiments, the encrypted data vault 130 may be used for secret management and password rotation.

In some embodiments, user management UI 110 may be used to communicate with the users. The user management UI 110 may be used to display dashboards or alarms generated using logs of events and interactions in the integrated identity management and monitoring system 100. API gateway 112 may be used to communicate with or manage APIs exposed to applications or services outside the integrated identity management and monitoring system. In some embodiments, These APIs may be consumed by User Management UI 110.

Intra system 132 may be used by internal users for logging into applications. In some embodiments, the intra system 132 may be integrated using Security Assertion Markup Language (SAML) and may integrate a server hosted by corporate enterprise with identity management system 120 instead of using external cloud-based servers. This integration with a server hosted by the corporate enterprise provides better security.

External user access system 134 may be used by customers of the business applications 108. External users include business-to-business (B2B) users and/or business-to-customer (B2C) users. Identity management system 120 may use the external user access system 134 to authenticate users. As an example, identity broker 515 (illustrated in FIG. 5) may authenticate users using the external user access system 134 (e.g., through OpenID Connect protocol, etc.). In some embodiments, authentication and authorization for identity management system administrators 101 may be performed using the active directory 136.

Figure 2:
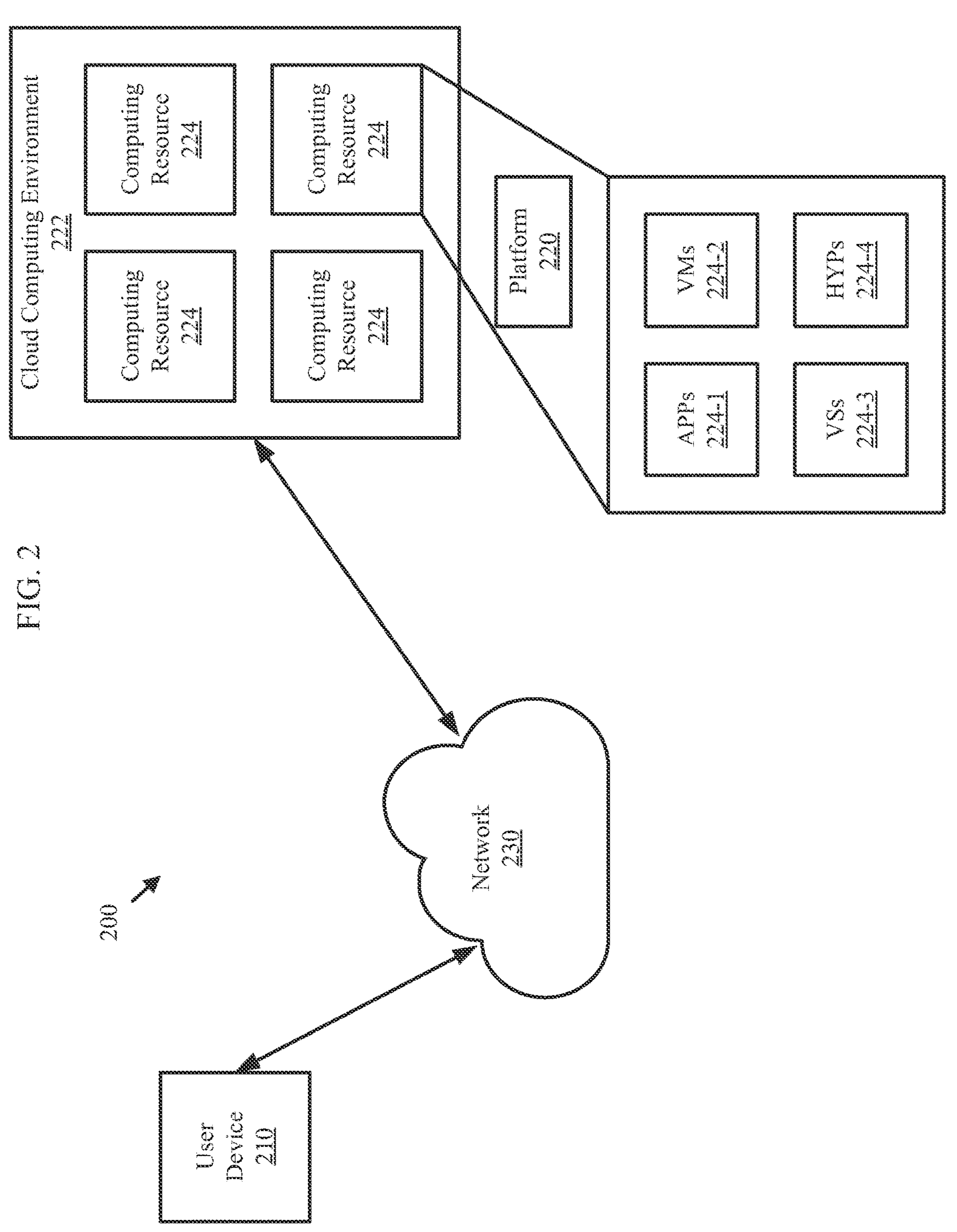
FIG. 2 is a diagram of an example environment in which systems and/or methods, described herein, may be implemented, according to embodiments.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions of the elements included in network management system 100 may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of integrated identity management and monitoring, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like. Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
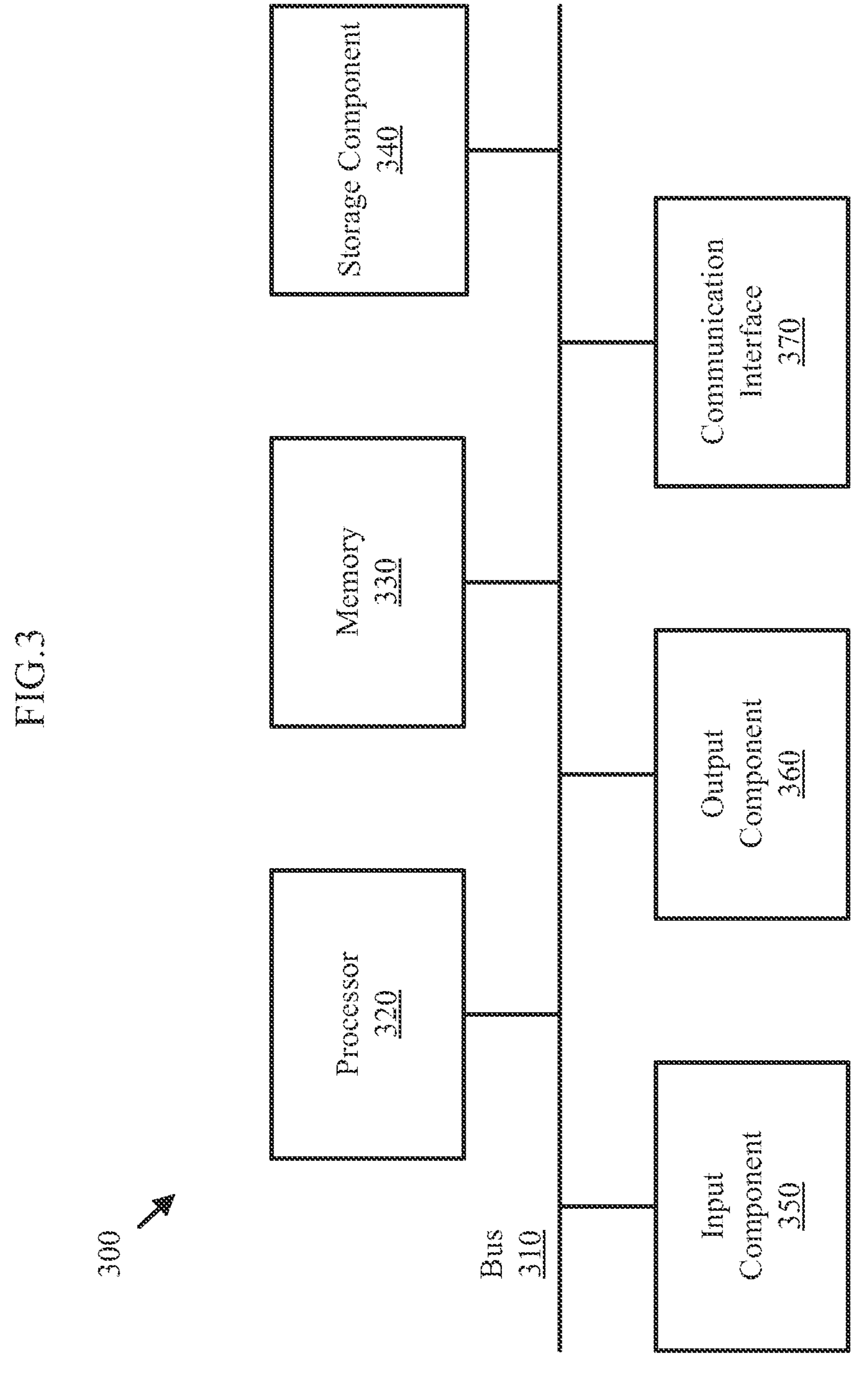
FIG. 3 is a diagram of example components of one or more devices of FIG. 2, according to embodiments.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable storage medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or components of FIG. 1 may be implemented by or using any one of the elements illustrated in FIGS. 2-3. For example any or one or more of identity management system 120, encrypted data vault 130, observation framework 128, business applications 108, user management UI 110, API gateway 112, user management API 113, user management database 114, intra system 132, external user access system 134, active directory 136, identity management system database 122, ID management API 116, and database and cache memory 124 may be implemented by or correspond to any one or more of user device 210, platform 220, computing resource 224, or one or more components of device 300.

Figure 4:
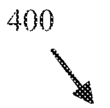
FIG. 4 is a flow chart of example processes for integrated identity management and monitoring system, according to embodiments.
Figure 4:
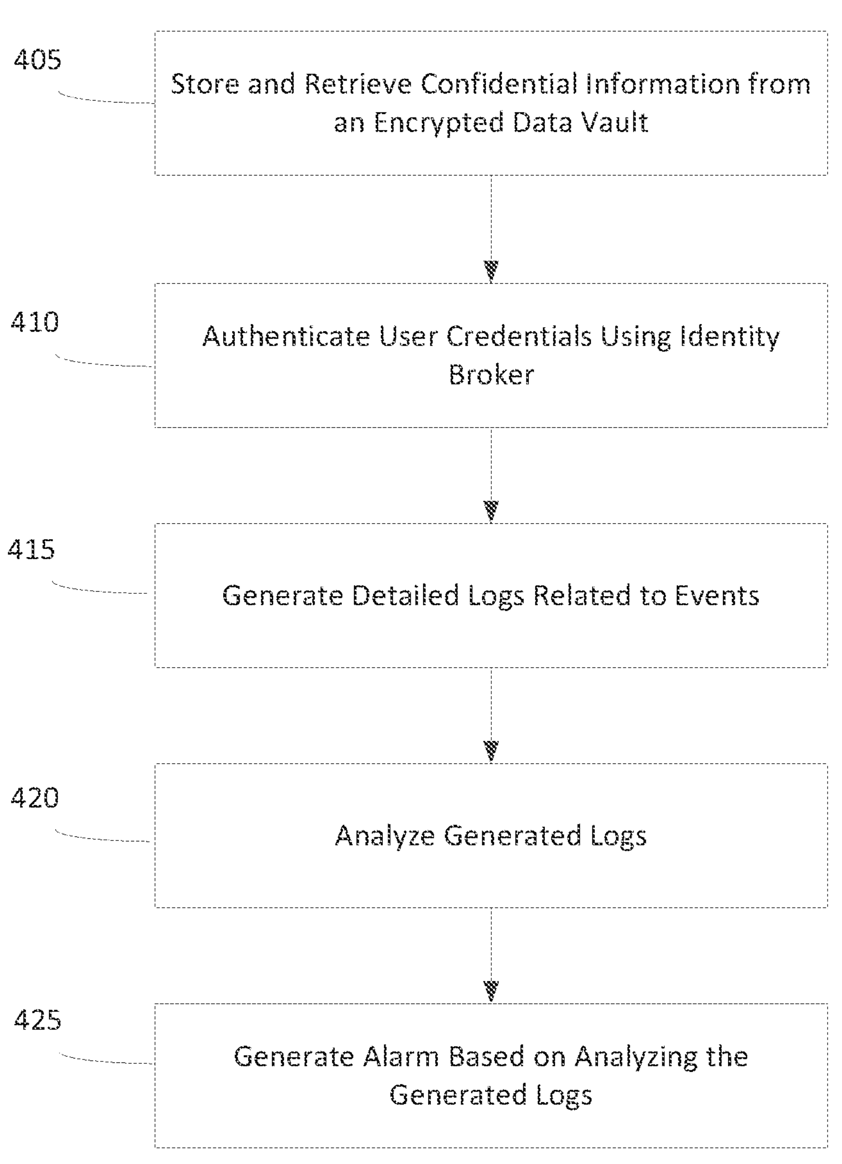

FIG. 4 is a flowchart illustrating a process 400 for identity management and monitoring. As illustrated in FIG. 4, one or more process blocks of processes 400 may be performed by any of the components of FIGS. 1-3 discussed above. As illustrated in FIG. 4, one or more process blocks of processes 400 may correspond to integrated identity management or monitoring system 100.

As shown in FIG. 4, process may include storing and retrieving confidential information from an encrypted data vault at operation 405. In embodiments, the confidential information may be stored in and retrieved from encrypted data vault 130.

In some embodiments, default admin credentials may be stored in the encrypted data vault and subsequent to generating an alarm, a request to retrieve the default admin credentials from the encrypted data vault may be generated.

For example, the default admin credentials may be stored in the encrypted data vault 130, and subsequent to generating an alarm, the request to retrieve the default admin credentials from the encrypted data vault 130 may be generated. Default admin credentials may be stored in the encrypted data vault because these credentials are not used by identity management system administrators 101 in day-to-day activities. When the need arises, identity management system administrators 101 may raise a request to retrieve the default admin credentials from the vault. For example, when an unscheduled network interruption occurs, when the integrated identity management and monitoring system needs to be deployed, restarted, or reconfigured, etc., the identity management system administrators 101 may request the default admin credentials from the encrypted data vault to restore the system and services.

In some embodiments, the default admin credentials may include service account credentials associated with identity management system 120, user management database 114, or database and cache memory 124, and may be stored in the encrypted data vault 130. As an example, if an issue associated any of identity management system 120, user management database 114, or database and cache memory 124 arose requiring deployment, reconfiguration, or a restart, an alarm may be generated associated with the respective component which may be the source of the issue. In response to generating an alarm, the request to retrieve the service account credentials of the respective component from the encrypted data vault 130 may be generated. Upon receiving the required service account credentials, the respective component may be deployed, reconfigured, or restarted based on the service account credentials. In some embodiments, request for the default admin credentials is generated upon detection of an event (e.g., reconfiguration, restart, etc.), prior to the generation of alarm.

In some embodiments, to register a new application, client application secret credentials may be stored in the encrypted data vault. In response to a determination that the new application needs to be deployed, restarted, reconfigured, or updated, a request to retrieve the client application secret credentials from the encrypted data vault may be generated. The new application needs to be deployed, restarted, reconfigured, or updated using the client secret credentials.

For example, to register a new application, client application secret credentials may be stored in the encrypted data vault 130. In response to a determination that the new application needs to be deployed, restarted, reconfigured, or updated, a request to retrieve the client secret credentials from the encrypted data vault 130 may be generated. The new application may be deployed, restarted, reconfigured, or updated based on the retrieved client secret credentials.

In some embodiments, to store sensitive information associated with an application, the sensitive information which may include confidential information relating to the new application and customers of the new application may be received. Further, the confidential information relating to the new application and customers of the new application may be extracted from the received information. The extracted confidential information relating to the new application and customers of the new application may be stored in the encrypted data vault. For example, the confidential information relating to the new application and customers of the new application may be stored in the encrypted data vault 130.

When a new application may be added to the business applications associated with the integrated identity management and monitoring system, information relating to the new application may be provided to the integrated identity management and monitoring system for registration. The integrated identity management and monitoring system may process the provided information and extract sensitive or confidential information. The integrated identity management and monitoring system may store sensitive information in the encrypted data vault. For example, the integrated identity management system may determine via a rule-based algorithm, keyword comparison, any technique known in the art, whether or not a part of the provided information contains sensitive or confidential information about customers of the new application or sensitive or confidential information about the new application itself.

In some embodiments, if the provided information does not contain confidential or sensitive information, the provided information may be stored in regular data storage. However, if the provided information includes confidential or sensitive information, the integrated identity management and monitoring system may extract the sensitive or confidential information and store the extracted confidential information in the encrypted data vault.

When the application requests to access the sensitive or confidential information stored in the encrypted data vault, the application may access the vault to receive the sensitive and confidential information.

In some embodiments, the sensitive or confidential information may be encrypted by the integrated identity management and monitoring system before storing it in the encrypted data vault. In some embodiments, the encrypted data vault further encrypts this encrypted information after the encrypted data vault receives the sensitive information from the integrated identity management and monitoring system. Thus, both the integrated identity management and monitoring system and the encrypted data vault provide encryption and decryption details to the application if the application wants to access the encrypted sensitive or confidential information stored in the encrypted data vault. This double encryption process ensures that only the application requesting sensitive or confidential information can decrypt and read the sensitive information, improving the system's security.

According to embodiments of the present disclosure, the confidential information, sensitive information, client application secret credentials, or default admin credentials stored in the encrypted data vault may be encrypted in a way that only the integrated identity management and monitoring system may decrypt and read the stored data.

As shown in FIG. 4, user credentials of a user may be authenticated using an identity an identity broker, wherein the identity broker identifies an identity provider associated with the user credentials at operation 410.

In some embodiments, the authentication may include receiving the user credential of the user. As an example, user credentials of a B2BE user 104 and an employee 106 may be received through the user management UI 110 or user device 210. Examples of user credentials may include user profile information (username, first name, last names, email), user access credentials (passwords), and application roles and permissions.

In some embodiments, the authentication may include determining the identity provider associated with the user credentials using the identity broker, wherein the identity provider may be one of a plurality of identity providers, and an application may be associated with the identity provider. For example, the authentication may include determining the identity provider associated with the user credentials using the identity broker 515.

In some embodiments, the authentication may include receiving a security token from the identity provider indicating a successful authentication of the user by the identity provider. The security token may be used by the integrated identity management and monitoring system to confirm that the authentication was performed by a trusted identity provider. In some embodiments, the security token may be a one-time token that may be invalidated after one use. In other embodiments the security token may expire within a specific time of it being issued.

In some embodiments, the authentication may include generating an access token for the user to access the application associated with the identity provider. In some embodiments, the access token may be unique to the user's account or the application. In some embodiments, the access token may be a one-time token that may be invalidated after one use. In other embodiments the access token may expire within a specific time of it being issued. If the access token is invalidated or expires, the user may have to repeat the above-mentioned process to be authenticated and access the application.

In some embodiments, subsequent to receiving the access token, the user may be directed to the application using the user management UI 110 or the user device 210, where the user may use the access token. The application may authenticate the user based on the access token, and may allow the user to access a service or resource within the application.

As shown in FIG. 4, detailed logs may be generated, wherein the logs may be related to events and interactions with the integrated identity management and monitoring system at operation 415.

According to embodiments of the present disclosure, the integrated identity management and monitoring system may be configured to maintain detailed logs and records of every event or interaction occurring in the system. These events or interactions may be associated with authenticating user credentials, user profile changes, role assignments or changes in role definitions, and new application registrations. For example, user access of application, responses from the identity providers, storing and retrieving data from the encrypted data vault, authentication events, user account or user information changes, changes in a user's role assignment, new client registrations, or unusual system restarts may be examples of events that may be logged or recorded. Logging or recording each such event and interaction enables rapid detection of faults or unusual system activity. Further, rapid detection also allows efficient and immediate troubleshooting of the faults or unusual activity detected. In some embodiments, these events or interactions may be transmitted or published to the observation framework 128.

In some embodiments, detailed logs may be generated related to events associated with the authenticating. In the same or other embodiments, generating detailed logs may include logging actions performed during the authenticating, user profile changes, role assignments, and new application registrations.

In some embodiments, generating detailed logs may include calculating key performance metrics associated with user actions based on the logging. For example, key performance metrics associated with user actions may include but not be limited to network connection strength, time to receive access to the requested application, the accuracy of the resources given access to, frequency of access, the pattern of access, commonly used devices for access, etc. In some embodiments, user patterns may be determined using artificial intelligence or machine learning techniques based on the logging. In some embodiments, the observation framework 128 may expose the events and interactions over an HTTP interface to query the key performance metrics.

In some embodiments, generating detailed logs may include calculating key performance metrics based on the logging of respective applications. For example, key performance metrics based on the logging of respective applications may include but not be limited to the request rate for an application, request errors for an application, availability of identity management system 120 and other components, and a number of users for an application. Key performance indicators may also include the time for response to a request, a delay in the authentication process, any delay in receiving information from any component of the integrated identity management and monitoring system. In some embodiments, the observation framework 128 may expose the events and interactions over an HTTP interface to query the key performance metrics.

In some embodiments, the generated logs may be used to generate a dashboard on a user interface or a user device to display overall system performance, resource utilization, alarms, alerts, and interface with the security operations personnel. In some embodiments, the metrics displayed on the generated dashboard may include but not be limited to: The total number of users created, number of logins per user identity provider, number of logins per client application, number of login errors for each client application, number of login errors for a single realm, memory usage, etc. According to embodiments, either the observation framework 128 or the integrated identity management and monitoring system may generate the dashboard on the user management UI 110 or user device 210.

As shown in FIG. 4, the generated logs may be analyzed at operation 420. In some embodiments, the analyzing may include a comparison between the generated logs and historically logged data. In some embodiments, the integrated identity management and monitoring system may periodically or continuously compare newly logged data with historical logged data to determine the overall system's performance. By comparing the newly generated logs with historical logs, the integrated identity management and monitoring system may determine that there may be a delay in the authentication process for a specific application or a specific user or determine the user activity may be suspect. In some embodiments, the observation framework 128 may periodically or continuously compare newly logged data with historical logged data to determine the overall system's performance.

In some embodiments, subsequent to the comparison, whether there may be a delay in one or more events based on the comparison between the generated logs and the historically logged data may be determined. For example, the integrated identity management and monitoring system may determine a delay in accessing a specific resource or application based on the time to access recorded in the currently generated log and the time to access recorded in the historical logs. Subsequent to the determination that there may be a delay in one or more events, a source of the delay may be identified. In some embodiments, the observation framework 128 may determine whether there may be a delay in one or more events based on comparing the generated logs and the historically logged data.

As shown in FIG. 4, an alarm may be generated at operation 425. In some embodiments, an alarm may be generated based on the analyzing of the generated logs. In some embodiments, generating the alarm may include displaying a notification on a user interface wherein the notification may indicate details about the delay and the source of the delay.

In some embodiments, whether a memory utilization in a pod may be higher than a first threshold may be determined subsequent to the comparison. For example, based on the comparison, the integrated identity management and monitoring system may determine that the current memory utilization in a pod may be higher than 85% over 10 minutes compared to previous memory utilization. In some embodiments, the observation framework 128 may determine that the current memory utilization in a pod may be higher than 85% over 10 minutes compared to the previous memory utilization in that pod.

In some embodiments, whether a CPU utilization of a pod may be higher than a second threshold may be determined. For example, based on the comparison, the integrated identity management and monitoring system may determine that the current CPU utilization of a pod may be higher than 80% over 5 minutes compared to the previous CPU utilization of that pod. In some embodiments, the observation framework 128 may determine that the current CPU utilization of a pod may be higher than 80% over 5 minutes compared to the previous CPU utilization of that pod.

Whether a heap usage for a pod may be higher than a third threshold may be determined in some embodiments. For example, based on the comparison, the integrated identity management and monitoring system may determine that the heap usage for a pod may higher than 90% over 5 minutes compared to the previous heap usage of that pod. In some embodiments, the observation framework 128 may determine that the current keep usage for the pod may be higher than 90% over 5 minutes compared to the previous heap usage of that pod In some embodiments, generating the alarm at operation 425 may include displaying a notification on a user interface. The notification may indicate details about at least one resource utilization, as mentioned earlier, being higher than their respective thresholds.

Although FIG. 4 shows example blocks of process 400, in some implementations, processes 400 may include additional blocks, fewer blocks, different blocks, or differently arranged blocks than those depicted in FIG. 4. In embodiments, one or more blocks of example blocks of process 400 may be combined or arranged in any order or amount. In embodiments, two or more of the blocks of processes 400 may be performed in parallel.

Figure 5:
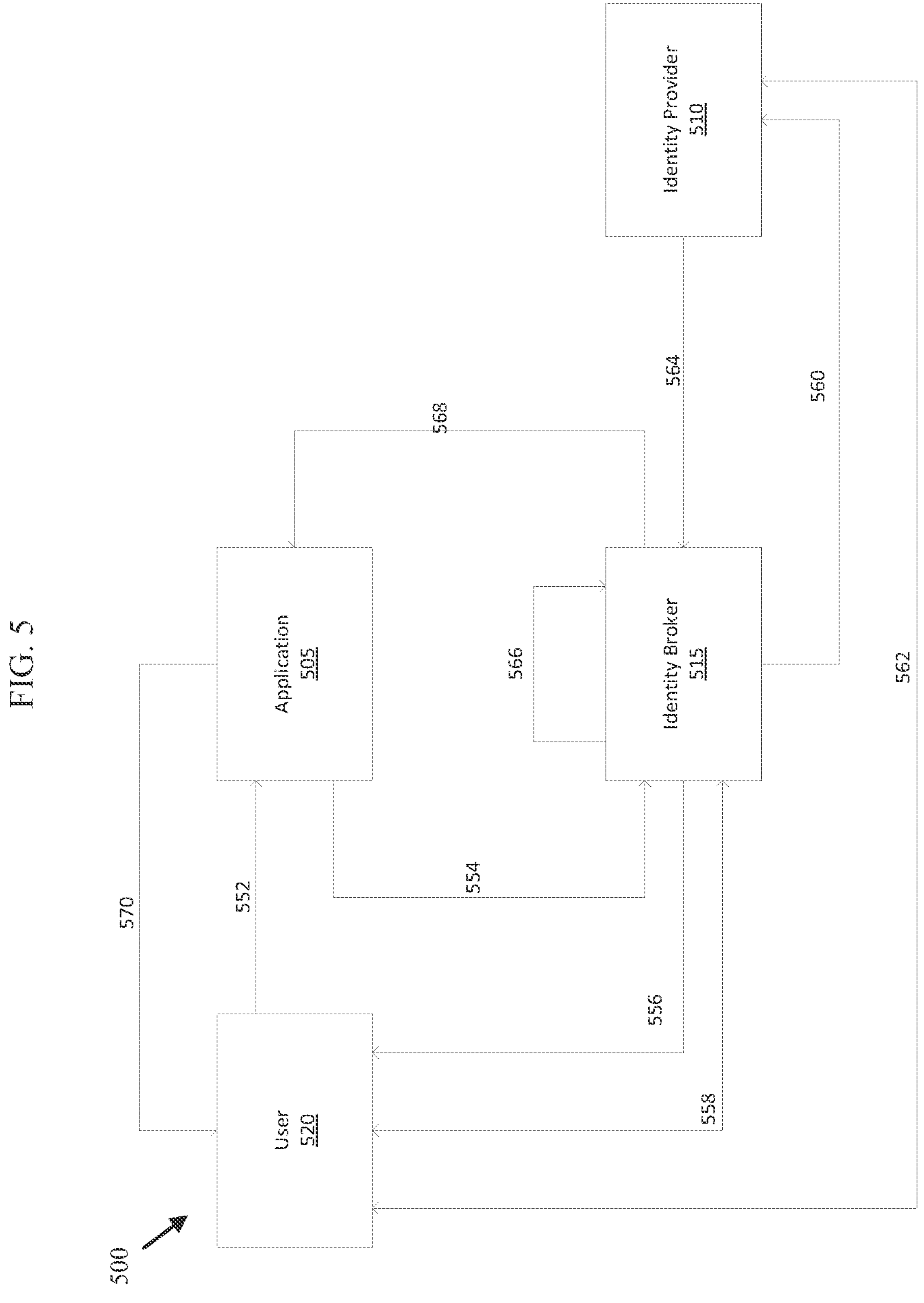
FIG. 5 illustrates a diagram of an example process for integrated identity management and monitoring system, according to embodiments.

According to embodiments, FIG. 5 illustrates a diagram of an example process 500 of identity brokering in an integrated identity management and monitoring system. An identity broker 515 may be an intermediary service provider configured in identity management system 120. The identity broker 515 may connect multiple service providers with a plurality of identity providers. In some embodiments, the identity broker 515 may be responsible for creating a trustworthy relationship with an external identity provider to access services exposed by applications associated with the external identity provider. For example, the identity broker 515 may create a trust relationship between associated applications and other applications outside of the integrated identity management and monitoring system. In this scenario, the applications associated with the integrated identity management and monitoring system and the external applications may exist in different domains, have different trust requirements, and have different communication requirements. Using the identity broker 515, a secure means of bridging those domains may be obtained. In some embodiments, identity management system 120 may utilize OIDC or SAML to integrate with an identity provider.

As shown in FIG. 5, an unauthenticated user 520 may request a protected resource in an application 505 at operation 552. The application 505 redirects user 520 to an identity broker 515 included in the integrated identity management and monitoring system at operation 554. The application 505 redirects the user 520 because application 505 may be an application with its access managed using integrated identity management and monitoring system.

Upon being redirected, user 520 may be presented with an intermediate page that may include a list of identity providers supported by the integrated identity management and monitoring system at operation 556. In some embodiments, the intermediate page may be presented on user management UI 110 or user device 210. When user 520 may be associated with only one applicable identity provider, i.e., only one application, user 520 may be presented with the login page of the one application user 520 may be associated with. However, when user 520 may be associated with a plurality of identity providers, i.e., a plurality of applications, user 520 may be presented with an intermediate page associated with the integrated identity management and monitoring system, including a list of supported identity providers.

At operation 558, user 520 may select one of the plurality of identity providers or one of the plurality of applications by interacting with the user management UI 110 or user device 210. The identity broker 515 may issue an authentication request to the target identity provider selected by the user (selected identity provider 510) and request authentication at operation 560. At operation 560, based on the authentication request by the identity broker 515, the user may be redirected to the login page off the integrated identity management and monitoring system.

At operation 562, user 520 may provide their user credentials or consent for authentication with the selected identity provider 510. On successful authentication by the identity provider 510, at operation 564, the user may be directed back to the integrated identity management and monitoring system with an authentication response. In some embodiments, the authentication response may include a security token used by the identity broker 515 to verify that a trusted identity provider performed the authentication. In some embodiments based on determining that a trusted identity provider performed the authentication, the identity broker 515 may retrieve information about the user from the identity provider 510.

At operation 566, the identity broker 515 may determine that the authentication response and/or the security token are valid. In some embodiments, the authentication response and/or the security token may be valid for one-time use or may be set to expire after a predetermined time. The identity broker 515 may ensure that the authentication response and/or the security token are not used or unexpired. In some embodiments, when the authentication response and/or the security token are valid, the identity broker 515 may create a new user or skip creating a new user if the user already exists. If the user is new, the identity broker 515, may ask the identity provider 510 for user information based on the user information not being provided in the security token. If the user already exists, the identity broker 515 may link the identity included in the security token with the user's existing account. Thus, based on if the user may be new or not, the identity broker 515 may perform identity federation or account linking. After performing identity federation or account linking, the identity broker 515 may issue an access token to the user, enabling the user to access the requested protected resource.

At operation 568, the identity broker 515 may redirect user 520 to application 505. In some embodiments, the identity broker 515 may include an access token when the identity broker 515 redirects user 520 to application 505. At operation 570, upon being redirected, user 520 may access the protected resource of application 505 using the access token generated by the identity broker.

FIG. 6 illustrates a diagram of an example process 600 of a user accessing application resources in an integrated identity management and monitoring system, according to embodiments.

As shown in FIG. 6, at operation 652, user 520 may request access to protected resources associated with an application 505. In some embodiments, the protected resources associated with application 505 may include microservices in application backend 608.

Application 505 may send a request to identity management system 120 to authenticate user 520 at operation 654. The authentication process may be performed using Open Authorization (OAuth) and include a proof key for code exchange (PKCE) extension in some embodiments. In this embodiment, application 505 may generate a PKCE code verifier and a code challenge. Application 505 may send the code challenge to identity management system 120 to authenticate user 520.

Upon receiving the code challenge, identity management system 120 may store the code challenge received in the request and redirect user 520 to the identity provider 510 at operation 656. For example, identity management system 120 may direct user 520 to intra system 132 or external user access system 134 based on user 520 being an internal user/employee or user 520 being an external user of a client application. In some embodiments, the identity provider 510 may be identified by the identity broker 515 or by user 520's selection.

At operation 658, the identity provider 510 may display a login page for user 520 to enter their user credentials. At operation 670, user 520 may enter their user credentials at the login page. In some embodiments, the identity provider 510 may display a login page associated with application 505.

At operation 672, identity provider 510 or application 505 may successfully authenticate user 520 based on the user's credentials and send authentication response to identity management system 120. In some embodiments, the authentication response may include a security token indicating the trustworthiness of the identity provider 510 or application 505.

At operation 674, identity management system 120 may match user information from the identity provider 510 to its user profile store. Identity management system 120 may determine whether user 520 may be a new or existing user. Based on user 520 being new, identity management system 120 may create a new account for user 520. On the other hand, based on user 520 being an existing user, identity management system 120 may link user information from the identity provider 510 to its user profile store.

At operation 676, application 505 may request tokens using an authorization code and a code verifier. Upon receiving a request for tokens from application 505, which may include an authorization code and a code verifier, identity management system 120 may compare the code verifier with the earlier received code challenge. Based on the code verifier matching the code challenge, identity management system 120 may issue an identity token, access token, and refresh token to application 505 at operation 678. The issuance of the identity token, the access token, and refresh tokens may indicate approval for user 520 to access protected resources associated with application 505.

At operation 680, application 505 may send a request to API gateway 112, and the request may include the access token issued by identity management system 120 to access the microservices in application backend 608. At operation 682, API gateway 112 may validate user 520's permission in identity management system 120 using database and cache memory 124. Based on user 520 having permission from identity management system 120, at operation 684, API gateway 112 may allow user 520 access to the microservices in application backend 608.

Figure 7:
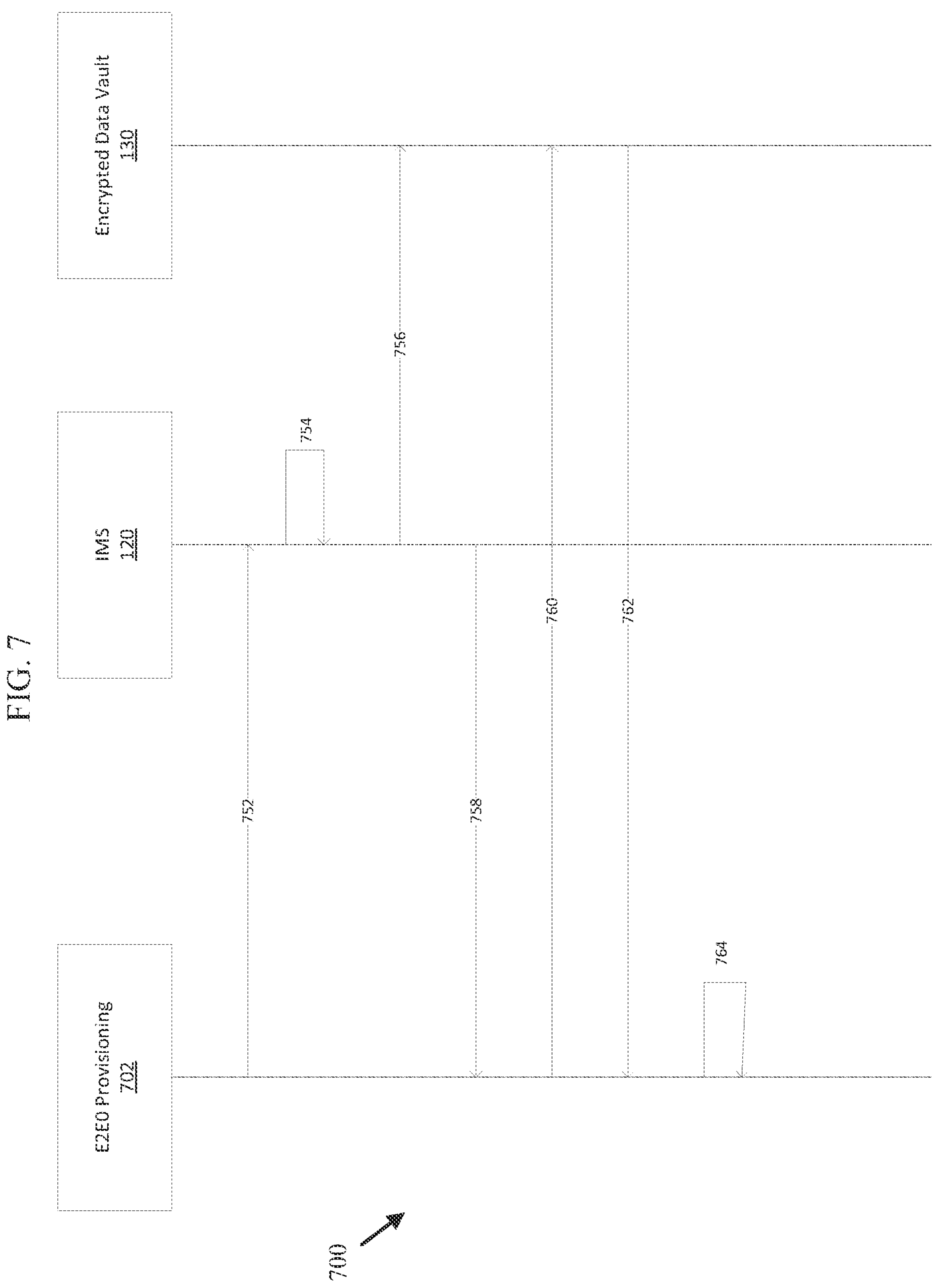
FIG. 7 illustrates a diagram of an example process for integrated identity management and monitoring system, according to embodiments.

FIG. 7 illustrates a diagram of an example process 700 for storing sensitive or confidential information associated with an application in an encrypted data vault, according to embodiments. As shown in FIG. 7, the process 700 may include an E2EO provisioning 702, identity management system 120, and encrypted data vault 130.

The E2EO provisioning 702 may provision a new application and register the new application in the identity management system 120. At operation 752, during the provisioning of the new application, the E2EO provisioning 702 may request identity management system 120 to create a client associated with the new application. In some embodiments, request by E2EO provisioning 702 may include information associated with the new application, which may include confidential information relating to the new application and customers of the new application.

Based on the received request, at operation 754, identity management system 120 may create a client for the new application, and may also generate a client secret. The client secret may include new application client configuration details, new application client admin credentials, and unique identifiers associated with the new application. In some embodiments, identity management system 120 may extract the confidential information relating to the new application and customers of the new application from the information associated with the new application.

At operation 756, identity management system 120 may store the client secret information and/or the confidential information relating to the new application and customers of the new application in the encrypted data vault 130. The sensitive or confidential data stored in the encrypted data vault 130 may be encrypted such that only the identity management system 120 may decrypt the sensitive and confidential data.

At operation 758, identity management system 120 may respond to the request by E2EO provisioning 702 with an indication of success and the encrypted data vault path where the client secret and/or the confidential information may be stored. In some embodiments, the client secret and/or the confidential information may not be included in the response to the request along with the indication of success. Using this path to the encrypted data vault, the E2EO provisioning 702 or the new application being provisioned may request to read the client secret or the confidential information stored in the encrypted data vault 130. For example, at operation 760, E2EO provisioning 702 may request to read the client secret or the confidential information stored in the encrypted data vault 130. E2EO provisioning 702 or the new application being provisioned may request to read the client secret or the confidential information stored in the encrypted data vault 130 based on a determination that the new application may have to be deployed, restarted, reconfigured, or updated.

At operation 762, based on E2EO provisioning 702 request to read the client secret or the confidential information stored in the encrypted data vault 130, the client secret or the confidential information may be decrypted and returned to the E2EO provisioning 702.

E2EO provisioning 702 or the new application being provisioned may deploy, restart, reconfigure, or update the E2EO provisioning 702 or the new application based on the client secret or the confidential information at operation 764.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for integrated authentication and monitoring, executed by an electronic device, the method comprising:

authenticating user credentials of a user using an identity broker of a centralized identity management system, wherein the identity broker identifies an identity provider, from among a plurality of identity providers, associated with the user credentials, the plurality of identity providers respectively associated with a plurality of applications such that each identity provider authenticates users via the identity broker to grant access rights to a corresponding application associated with that identity provider;

generating, by an observation framework integrated in the centralized identity management system, detailed logs related to events associated with the authenticating;

analyzing, by the observation framework, the generated logs; and generating, by the observation framework, an alarm based on the analyzing of the generated logs, wherein the authenticating comprises:

determining, by the identity broker, the identity provider associated with an application to which the user is attempting access, from among the plurality of identity providers respectively associated with the plurality of applications;

issuing, by the identity broker, an authentication request to the determined identity provider; and providing, by the identity broker, the user access to the application based on a successful authentication by the determined identity provider, wherein the analyzing comprises a comparison between the generated logs and historically logged data, and wherein the method further comprises:

determining there is a delay in one or more events based on the comparison between the generated logs and the historically logged data; and identifying a source of the delay, based on the generated logs.

2. The method of claim 1, wherein the authenticating further comprises:

receiving the user credentials of the user;

receiving a security token from the identity provider indicating a successful authentication of the user by the identity provider; and generating an access token for the user to access the application associated with the identity provider.

3. The method of claim 1, wherein the generating detailed logs comprises:

logging actions performed during any of the authenticating, user profile changes, role assignments, and new application registrations;

calculating key performance metrics associated with user actions based on the logging; and calculating key performance metrics associated with respective applications based on the logging.

4. The method of claim 1, wherein the generating the alarm comprises displaying a notification on a user interface wherein the notification indicates details about the delay and the source of the delay.

5. The method of claim 1, further comprising determining, based on the comparison, at least one of:

a memory utilization in a pod is higher than a first threshold, a CPU utilization of the pod is higher than a second threshold, or a heap usage for the pod is higher than a third threshold; and generating the alarm comprises displaying a notification on a user interface wherein the notification indicates details about the at least one determining.

6. The method of claim 1, wherein prior to authenticating the user credentials, the method further comprises storing default admin credentials in an encrypted data vault, and wherein subsequent to generating the alarm, the method comprises generating a request to retrieve the default admin credentials from the encrypted data vault; and address a source of the alarm using the default admin credentials.

7. The method of claim 1, wherein prior to authenticating the user credentials, the method further comprises registering a new application, and wherein the registering the new application comprises:

storing client secret credentials in an encrypted data vault;

in response to determining that the new application needs to be deployed, generating a request to retrieve the client secret credentials from the encrypted data vault; and deploying the new application using the client secret credentials.

8. The method of claim 1, wherein prior to authenticating the user credentials, the method further comprises storing sensitive information associated with a new application, and wherein the storing the sensitive information for the new application comprises:

receiving information associated with the new application, wherein the information includes confidential information relating to the new application and customers of the new application;

extracting the confidential information relating to the new application and the customers of the new application; and storing the confidential information relating to the new application and the customers of the new application in an encrypted data vault.

9. An apparatus for integrated identity management and monitoring, the apparatus comprising:

a memory configured to store instructions; and one or more processors configured to execute the instructions to:

authenticate user credentials of a user using an identity broker of a centralized identity management system, wherein the identity broker identifies an identity provider, from among a plurality of identity providers, associated with the user credentials, the plurality of identity providers respectively associated with a plurality of applications such that each identity provider authenticates users via the identity broker to grant access rights to a corresponding application associated with that identity provider;

generate, by an observation framework integrated in the centralized identity management system, detailed logs related to events associated with the authenticating;

analyze, by the observation framework, the generated logs; and generate, by the observation framework, an alarm based on the analyzing of the generated logs, wherein the authenticating comprises:

determining, by the identity broker, the identity provider associated with an application to which the user is attempting access, from among the plurality of identity providers respectively associated with the plurality of applications;

issuing, by the identity broker, an authentication request to the determined identity provider; and providing, by the identity broker, the user access to the application based on a successful authentication by the determined identity provider, wherein the analyzing comprises a comparison between the generated logs and historically logged data, and wherein prior to authenticating the user credentials, the one or more processors is further configured to store default admin credentials in an encrypted data vault, and wherein subsequent to generating the alarm, on or more processors is further configured to generate a request to retrieve the default admin credentials from the encrypted data vault; and address a source of the alarm using the default admin credentials.

10. The apparatus of claim 9, wherein the authenticating further comprises:

receiving the user credentials of the user;

receiving a security token from the identity provider indicating a successful authentication of the user by the identity provider; and generating an access token for the user to access the application associated with the identity provider.

11. The apparatus of claim 9, wherein the generating the detailed logs comprises:

logging actions performed during any of the authenticating, user profile changes, role assignments, and new application registrations;

calculating key performance metrics associated with user actions based on the logging; and calculating key performance metrics associated with respective applications based on the logging.

12. The apparatus of claim 9, wherein prior to authenticating the user credentials, the one or more processors is further configured to register a new application, and wherein the registering the new application comprises:

storing client secret credentials in an encrypted data vault;

in response to determining that the new application needs to be deployed, generating a request to retrieve the client secret credentials from the encrypted data vault; and deploying the new application using the client secret credentials.

13. The apparatus of claim 9, wherein prior to authenticating the user credentials, the one or more processors is further configured to store sensitive information associated with a new application, and wherein the storing the sensitive information for the new application comprises:

receiving information associated with the new application, wherein the information includes confidential information relating to the new application and customers of the new application;

extracting the confidential information relating to the new application and the customers of the new application; and storing the confidential information relating to the new application and the customers of the new application in an encrypted data vault.

14. A non-transitory computer-readable medium storing instructions, the instructions comprising: one or more instructions that, when executed by one or more processors of a device for automatic troubleshooting, cause the one or more processors to:

authenticate user credentials of a user using an identity broker of a centralized identity management system, wherein the identity broker identifies an identity provider, from among a plurality of identity providers, associated with the user credentials, the plurality of identity providers respectively associated with a plurality of applications such that each identity provider authenticates users via the identity broker to grant access rights to a corresponding application associated with that identity provider;

generate, by an observation framework integrated in the centralized identity management system, detailed logs related to events associated with the authenticating;

analyze, by the observation framework, the generated logs; and generate, by the observation framework, an alarm based on the analyzing of the generated logs, wherein the authenticating comprises:

determining, by the identity broker, the identity provider associated with an application to which the user is attempting access, from among the plurality of identity providers respectively associated with the plurality of applications;

issuing, by the identity broker, an authentication request to the determined identity provider; and providing, by the identity broker, the user access to the application based on a successful authentication by the determined identity provider, wherein the analyzing comprises a comparison between the generated logs and historically logged data, and wherein prior to authenticating the user credentials, the one or more processors is further configured to store default admin credentials in an encrypted data vault, and wherein subsequent to generating the alarm, on or more processors is further configured to generate a request to retrieve the default admin credentials from the encrypted data vault; and address a source of the alarm using the default admin credentials.

15. The non-transitory computer-readable medium of claim 14, wherein the authenticating further comprises:

receiving the user credentials of the user;

receiving a security token from the identity provider indicating a successful authentication of the user by the identity provider; and generating an access token for the user to access the application associated with the identity provider.

16. The non-transitory computer-readable medium of claim 14, wherein the generating the detailed logs comprises:

logging actions performed during any of the authenticating, user profile changes, role assignments, and new application registrations;

calculating key performance metrics associated with user actions based on the logging; and calculating key performance metrics associated with respective applications based on the logging.

* * * * *